which this patent is

(12) United States Patent
Shiroishi (10) Patent No.: US 11,643,130 B2
(45) Date of Patent: May 9, 2023

(54) STEERING DEVICE (71) Applicant: YAMADA MANUFACTURING CO., LTD., Kiryu (JP)

(72) Inventor: Yoshinori Shiroishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 208 days.

(21) Appl. No.: 16/604,655

(22) PCT Filed: Jun. 13, 2018

(86) PCT No.: PCT/JP2018/022506
§ 371 (c)(1),
(2) Date: Oct. 11, 2019

(87) PCT Pub. No.: WO2018/230587
PCT Pub. Date: Dec. 20, 2018

(65) Prior Publication Data
US 2020/0164910 A1 May 28, 2020

(30) Foreign Application Priority Data
Jun. 14, 2017 (JP) .............................. JP2017-116603

(51) Int. Cl.
*B62D 1/184* (2006.01)
*B62D 1/185* (2006.01)
(Continued)

(52) U.S. Cl.
CPC .............. *B62D 1/184* (2013.01); *B62D 1/18* (2013.01); *B62D 1/185* (2013.01); *B62D 1/19* (2013.01)

(58) Field of Classification Search
CPC .......... B62D 1/18; B62D 1/184; B62D 1/185; B62D 1/187; B62D 1/189
See application file for complete search history.

(56) References Cited

U.S. PATENT DOCUMENTS 3,851,542 A * 12/1974 Adams ..................... B62D 1/18
74/492
4,257,624 A * 3/1981 Hansen ................... B62D 1/184
280/775

(Continued)

FOREIGN PATENT DOCUMENTS

CN 102822034 12/2012
JP S60-023314 2/1985
(Continued)

OTHER PUBLICATIONS

International Search Report, dated Aug. 28, 2018, 4 pages.
(Continued)

*Primary Examiner* — Barry Gooden, Jr.
(74) *Attorney, Agent, or Firm* — Rankin, Hill & Clark LLP (57) ABSTRACT A steering device according to an aspect of the present invention includes an outer shaft, an inner shaft, an outer column, and an inner column. The inner shaft has a sliding portion configured to be capable of being inserted into the outer shaft, and a bearing-mounting portion that is connected to the sliding portion in an axial direction thereof and is configured not to be capable of being inserted into the outer shaft. In the bearing-mounting portion, rear bearings are disposed with an interval therebetween in the axial direction.

15 Claims, 5 Drawing Sheets (51) Int. Cl.
*B62D 1/19* (2006.01)
*B62D 1/18* (2006.01)

(56) References Cited

U.S. PATENT DOCUMENTS

| | | | | |
|---|---|---|---|---|
| 4,890,505 | A * | 1/1990 | Kinoshita | B62D 1/184 74/493 |
| 5,071,163 | A * | 12/1991 | Heinrichs | B62D 1/185 280/775 |
| 5,152,358 | A | 10/1992 | Kozuka | |
| 5,269,562 | A * | 12/1993 | Peitsmeier | B62D 1/184 280/775 |
| 7,490,855 | B2 * | 2/2009 | Inayoshi | B62D 1/192 280/777 |
| 2005/0011297 | A1 * | 1/2005 | Oshita | B62D 1/187 74/493 |
| 2005/0066761 | A1 * | 3/2005 | Arihara | B62D 1/185 74/493 |
| 2006/0005658 | A1 * | 1/2006 | Armstrong | B62D 1/184 74/492 |
| 2007/0039403 | A1 | 2/2007 | Manwaring et al. | |
| 2007/0126222 | A1 * | 6/2007 | Koya | B62D 1/185 280/775 |
| 2016/0046317 | A1 * | 2/2016 | Nagasawa | B62D 1/185 74/493 |
| 2016/0068181 | A1 * | 3/2016 | Warashina | B62D 1/185 74/493 |
| 2016/0288819 | A1 * | 10/2016 | Uesaka | B62D 1/16 |
| 2017/0274923 | A1 * | 9/2017 | Uesaka | B62D 1/19 |
| 2018/0001845 | A1 * | 1/2018 | Orihara | B62D 1/185 |
| 2018/0251148 | A1 * | 9/2018 | Osawa | B62D 1/195 |
| 2018/0327017 | A1 * | 11/2018 | Suzuki | B62D 1/184 |
| 2019/0061803 | A1 * | 2/2019 | Inoue | B62D 1/189 |
| 2019/0152507 | A1 * | 5/2019 | Shiroishi | B62D 1/184 |
| 2019/0152511 | A1 * | 5/2019 | Shiroishi | B62D 1/192 |
| 2019/0225254 | A1 * | 7/2019 | Ishimura | B62D 1/192 |
| 2019/0344821 | A1 * | 11/2019 | Nishimine | B62D 1/185 |
| 2020/0039566 | A1 * | 2/2020 | Sekiguchi | B62D 1/181 |
| 2020/0039567 | A1 * | 2/2020 | Sekiguchi | B62D 1/181 |
| 2020/0039568 | A1 * | 2/2020 | Sekiguchi | B62D 1/181 |
| 2020/0361514 | A1 * | 11/2020 | Saito | F16H 25/24 |
| 2021/0122406 | A1 * | 4/2021 | Domig | B62D 1/184 |
| 2022/0297741 | A1 * | 9/2022 | Homma | B62D 1/185 |

FOREIGN PATENT DOCUMENTS

| | | |
|---|---|---|
| JP | 2006-069360 | 3/2006 |
| JP | 2006-264424 | 10/2006 |
| JP | 2008-189223 | 8/2008 |
| JP | 2008-195354 | 8/2008 |
| JP | 2008-22202 A | 9/2008 |
| JP | 2008-972207 A | 9/2008 |
| JP | 2009-029362 | 2/2009 |
| JP | 2014-105811 | 6/2014 |
| JP | 2016-060450 | 4/2016 |
| JP | 2016-112988 | 6/2016 |

OTHER PUBLICATIONS

Chinese Office Action dated Jun. 30, 2021, English Search Report included, 12 pages.
U.S. Office Action from corresponding U.S. Appl. No. 17/477,928 dated Jul. 11, 2022; 9 pages.
Japanese Office Action with English Translation dated May 17, 2022, Application No. 2019-525471, 6 pages.

* cited by examiner

STEERING DEVICE

TECHNICAL FIELD

The present invention relates to a steering device.

Priority is claimed on Japanese Patent Application No. 2017-116603, filed Jun. 14, 2017, the contents of which are incorporated herein by reference.

BACKGROUND ART

Some steering devices include a telescopic function. The telescopic function adjusts a position of a steering wheel in a front-to-rear direction in accordance with physical differences and a driving posture of drivers. This type of steering device includes an outer column mounted on a vehicle body, and an inner column which is inserted into the outer column to be movable relative to the outer column. For example, in a configuration of Patent Literature 1 below, an outer shaft is rotatably supported in an inner column via a bearing. A steering wheel is attached to a rear-end portion of the outer shaft. An inner shaft is rotatably supported in an outer column via a bearing. The inner shaft is inserted into the outer shaft.

According to the configuration of Patent Literature 1, during a telescopic operation, the inner column and the outer shaft move in an axial direction thereof relative to the outer column and the inner shaft, respectively. In the configuration of Patent Literature 1, the outer shaft is positioned further rearward in the vehicle body and is supported by bearings at both end portions thereof in the axial direction. For this reason, in the configuration of Patent Literature 1, it is recognized that vibrational stiffness can be enhanced.

CITATION LIST

Patent Literature

[Patent Literature 1] Japanese Unexamined Patent Application, First Publication No. 2006-69360

SUMMARY OF INVENTION

Technical Problem

On the other hand, in a steering device, there is still room for improvement in that a desired vibrational stiffness needs to be obtained when a stroke amount at the time of telescopic operation and secondary collapse (a stroke at the time of secondary collision) is secured.

Aspects of the present disclosure have been made in view of the circumstances described above, and provide a steering device which can obtain a desired vibrational stiffness while securing a stroke amount.

Solution to Problem

In order to solve the above problem, the present disclosure has adopted the following aspects.

(1) A steering device according to an aspect of the present disclosure includes an outer shaft, an inner shaft which is inserted into the outer shaft to be movable relative to the outer shaft in a shaft axis direction thereof and to which a steering wheel is attached, an outer column configured to rotatably support the outer shaft around the shaft axis via a front bearing, and an inner column configured to rotatably support the inner shaft around the shaft axis via a rear bearing, the inner column being inserted into the outer column to be movable relative to the outer column in the shaft axis direction. The inner shaft has an insertable region configured to be capable of being inserted into the outer shaft, and a non-insertable region which is connected to the insertable region in the shaft axis direction and is configured not to be capable of being inserted into the outer shaft. The rear bearing has a first bearing and a second bearing which are disposed with an interval therebetween in the shaft axis direction in the non-insertable region.

The steering device according to the present aspect is configured such that the outer shaft is rotatably supported in the outer column, and the inner shaft is rotatably supported in the inner column. According to this configuration, even if a mounting member such as a key lock collar is externally fitted to the outer shaft positioned further forward in a vehicle body, the mounting member can be inhibited from being disposed on a movement trajectory of the inner column and the inner shaft. For this reason, at the time of a stroke during a telescopic operation, a secondary collapse or the like, interference between the inner column or the inner shaft and the mounting member can be inhibited. Thus, as compared with the configuration in the conventional technique in which the inner shaft is rotatably supported in the outer column positioned on a front side of the vehicle body, and the outer shaft is rotatably supported in the inner column positioned on a rear side of the vehicle body, stroke amounts of the inner column and the inner shaft can be secured.

In particular, in the present aspect, the first bearing and the second bearing are disposed in the non-insertable region which is configured not to be capable of being inserted into the outer shaft during the telescopic operation or the secondary collapse. According to this configuration, interference between a bearing positioned furthest forward among the bearings in the vehicle body and the outer shaft and members surrounding the outer shaft at the time of the stroke can be inhibited. A displacement of the inner shaft is inhibited, and the inner shaft is stably supported. Thus, vibrational stiffness can be improved.

Therefore, in the present aspect, it is possible to obtain a desired vibrational stiffness while securing the stroke amount.

(2) In the steering device according to the above aspect (1), at least one of the front bearing, the first bearing, and the second bearing may be a resin bush.

According to the present aspect, the steering device can be simplified.

(3) In the steering device according to the aspect (1), the first bearing may be positioned forward from the second bearing in the vehicle body. A first stopper which comes into contact with an outer ring of the first bearing in the shaft axis direction may be formed in a portion of the inner column positioned forward from the first bearing in the vehicle body. A second stopper which comes into contact with an outer ring of the second bearing in the shaft axis direction may be formed in a portion of the inner column positioned rearward from the second bearing in the vehicle body.

According to the present aspect, since positional deviations of the first bearing and the second bearing relative to the inner column in the shaft axis direction can be inhibited, a steering shaft can be prevented from coming off.

In particular, since the steering shaft is prevented from coming off by the stopper formed on the inner column, it is unnecessary to separately use a stop ring or the like for fixing the outer ring. Therefore, the number of components can be reduced.

(4) In the steering device according to any one of the above aspects (1) to (3), the non-insertable region may be formed to be larger in diameter than the insertable region.

According to the present aspect, since rigidity of the inner shaft can be enhanced, vibrational stiffness can be enhanced.

In addition, in the present aspect, since only the non-insertable region is formed to have a larger diameter, an increase in weight accompanying enlargement of the diameter can be inhibited as much as possible, as compared with a case in which the entire inner shaft is formed to have a larger diameter.

(5) In the steering device according to any one of the aspects (1) to (4), the insertable region may be formed in a hollow cylindrical shape. The non-insertable region may be formed in a solid cylindrical shape.

According to the present aspect, since rigidity of the inner shaft can be enhanced, vibrational stiffness can be enhanced.

In particular, in the present aspect, since only the non-insertable region is formed to be solid, an increase in weight accompanying being formed to be solid can be inhibited as much as possible, as compared with a case in which the entire inner shaft is formed to be solid.

(6) In the steering device according to any one of the above aspects (1) to (5), a key lock collar configured to restrict rotation of the outer shaft relative to the outer column in a locked state may be externally fitted to the outer shaft. An outer diameter of the key lock collar may be smaller than an inner diameter of the inner column.

According to the present aspect, regardless of the place where the key lock collar is disposed, interference between the inner column and the key lock collar can be reliably inhibited at the time of a stroke of the inner column. Thus, a stroke amount of the inner column can be secured.

(7) A steering device according to an aspect of the present disclosure includes a front shaft, a rear shaft which is positioned rearward from the front shaft in a vehicle body and is configured to be movable relative to the front shaft in a shaft axis direction, and to which a steering wheel is attached, a front column configured to rotatably support the front shaft around the shaft axis via a front bearing, and a rear column configured to rotatably support the rear shaft around the shaft axis via a rear bearing and is configured to be movable relative to the front column in the shaft axis direction. The rear bearing has a first bearing and a second bearing which are disposed with a predetermined interval therebetween in the shaft axis direction. A distance between the first bearing and the second bearing in the shaft axis direction may be set to be 40 mm or less.

(8) A steering device according to an aspect of the present disclosure includes a steering shaft having a rear-end portion to which a steering wheel is attached, a rear bearing configured to support the steering shaft, a front bearing configured to support the steering shaft in front of the rear bearing, and a steering column configured to rotatably support the steering shaft around a shaft axis via the rear bearing and the front bearing. The rear bearing has a first bearing and a second bearing which are disposed with a predetermined interval therebetween in the shaft axis direction. A distance between the first bearing and the second bearing in the shaft axis direction may be set to be 40 mm or less.

As a result of the present inventor's studies for achieving the objects mentioned above, it was found that a rate of change in vibrational stiffness in a case where the distance between the first bearing and the second bearing is longer than 40 mm was smaller than a rate of change in vibrational stiffness in a case where the distance is 40 mm or less. That is, it was found that if the distance exceeds a predetermined range, regardless of the distance being increased thereafter, no significant improvement of vibrational stiffness can be expected.

Therefore, according to the present aspect, by setting the distance between the first bearing and the second bearing to be 40 mm or less, a desired vibrational stiffness can be obtained. By setting the distance between the first bearing and the second bearing to be 40 mm or less, the stroke amount when the front shaft and the front column and the rear shaft and the rear column move in the shaft axis direction can be secured.

Advantageous Effects of Invention

According to each aspect of the present disclosure, a desired vibrational stiffness can be obtained while securing the stroke amount.

DESCRIPTION OF EMBODIMENTS

Next, an embodiment of the present disclosure will be described with reference to the drawings.

First Embodiment

Figure 1:
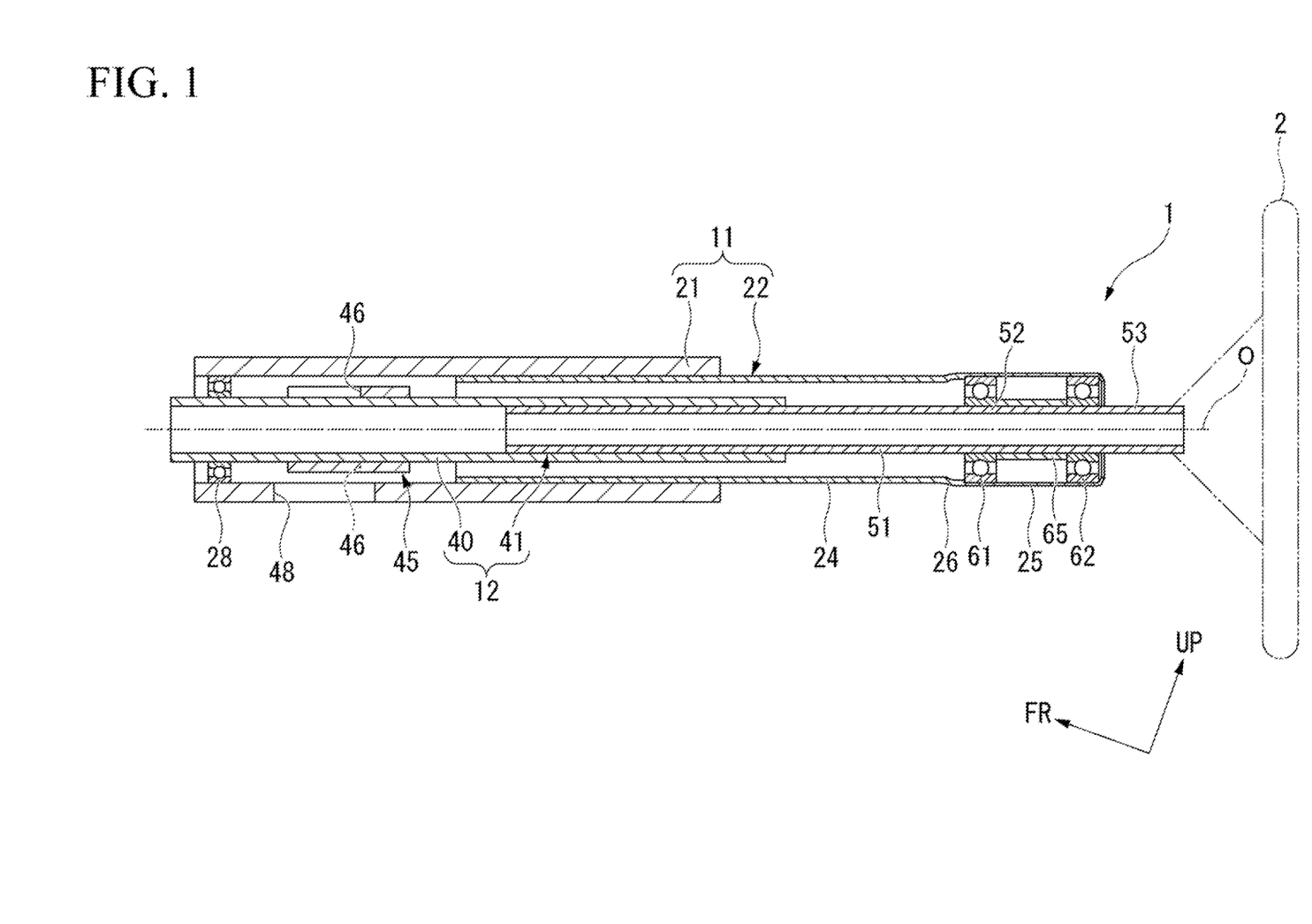
FIG. 1 is a cross-sectional view showing a steering device according to a first embodiment.

FIG. 1 is a cross-sectional view of a steering device 1.

As shown in FIG. 1, the steering device 1 is mounted on a vehicle. The steering device 1 controls a steering angle of a vehicle wheel in accordance with a rotating operation of a steering wheel 2. Also, in the following description, unless otherwise described, directions such as forward, rearward, upward, downward, left, and right indicate the directions in a state in which they are applied to a vehicle. In this case, in the drawings, an arrow UP indicates an upward direction, and an arrow FR indicates a forward direction.

The steering device 1 mainly includes a column unit 11 and a steering shaft 12. The column unit 11 and the steering shaft 12 are each formed in a tubular shape extending along an axis O. Therefore, in the following description, a direction in which the axis O of the column unit 11 and the steering shaft 12 extends may be simply referred to as an axial direction (a shaft axis direction), a direction orthogonal to the axis O may be referred to as a radial direction, and a direction around the axis O may be referred to as a circumferential direction.

The steering device 1 of the present embodiment is mounted on the vehicle with the axis O intersecting a front-to-rear direction. Specifically, the axis O of the steering device 1 extends upward in the rearward direction. However, in the following description of the steering device 1, for the sake of convenience, a direction toward the steering wheel 2 in the axial direction is simply referred to as a rear side, and a direction toward a side opposite to the steering wheel 2 is simply referred to as a front side. Also, regarding the radial direction, a direction in the vertical direction in a state in which the steering device 1 is attached to the vehicle is simply referred to as a vertical direction.

<Column Unit>

The column unit 11 has an outer column (a front column) 21 and an inner column (a rear column) 22.

The outer column 21 is formed in a tubular shape extending along the axis O. The outer column 21 is attached to a vehicle body via a bracket (not shown). An outer ring of a front bearing 28 is fitted (press-fitted) into a front-end portion of the outer column 21 inside the outer column 21.

The inner column 22 is formed in a tubular shape extending along the axis O. Specifically, the inner column 22 has a column small-diameter portion 24, a column large-diameter portion 25, and a connection portion 26. The column large-diameter portion 25 is positioned behind the column small-diameter portion 24. The connection portion 26 connects the column small-diameter portion 24 to the column large-diameter portion 25.

An outer diameter of the column small-diameter portion 24 is smaller than an inner diameter of the outer column 21. The column small-diameter portion 24 is inserted into the outer column 21 from behind the outer column 21. The inner column 22 is configured to be movable relative to the outer column 21 in the axial direction while an outer circumferential surface of the column small-diameter portion 24 slides on an inner circumferential surface of the outer column 21.

Figure 2:
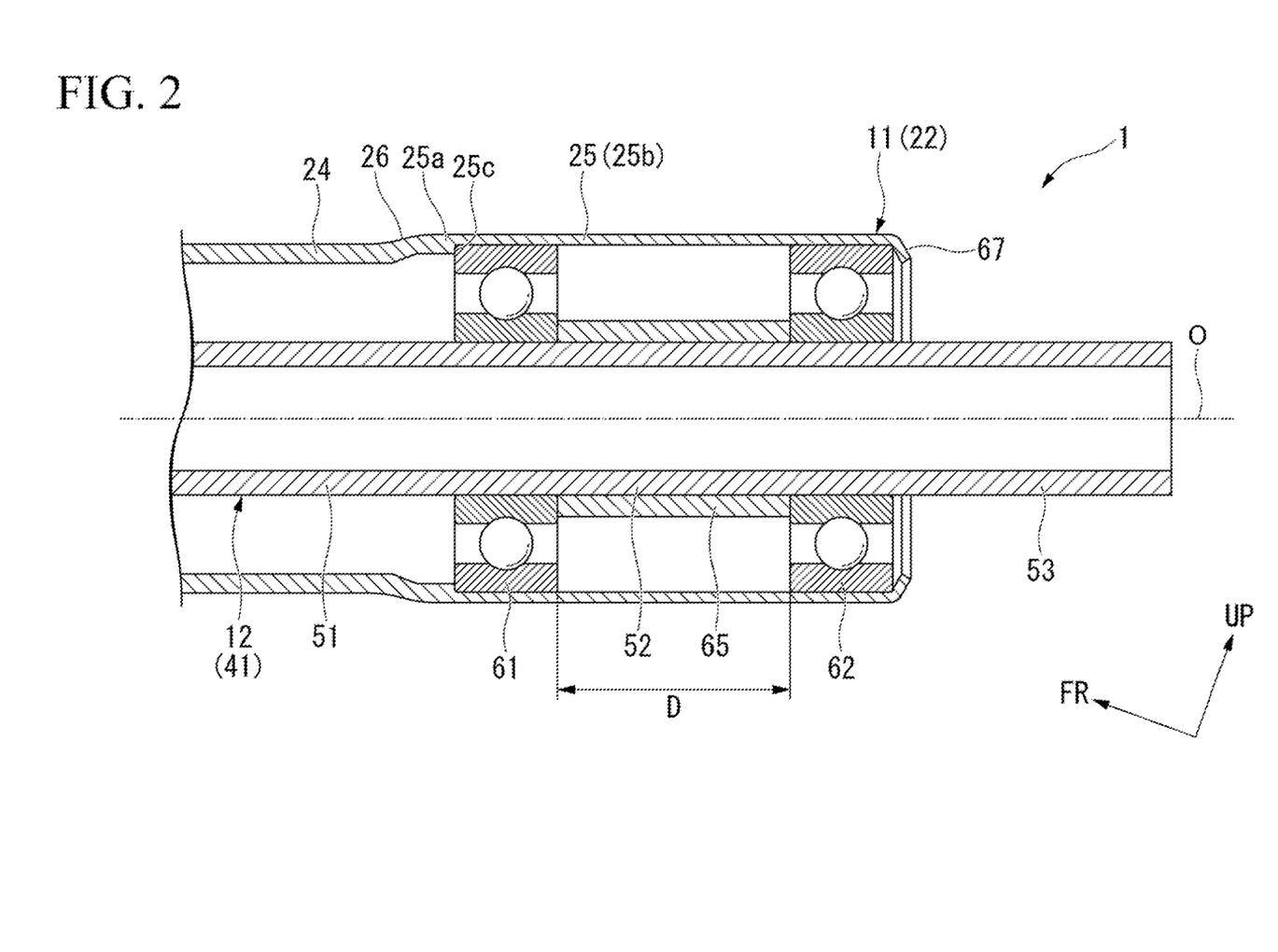
FIG. 2 is an enlarged cross-sectional view showing the steering device according to the first embodiment.

FIG. 2 is an enlarged cross-sectional view of the steering device 1.

As shown in FIG. 2, the connection portion 26 connects a rear end edge of the column small-diameter portion 24 and a front end edge of the column large-diameter portion 25. In the illustrated example, an outer diameter of the connection portion 26 gradually increases toward the rearward direction. However, the connection portion 26 may be orthogonal to the axis O.

The column large-diameter portion 25 extends rearward from a rear end edge of the connection portion 26. An outer diameter of the column large-diameter portion 25 is larger than the inner diameter of the outer column 21. In the inner column 22 of the present embodiment, the column small-diameter portion 24 is an insertable region configured to be capable of being inserted into the outer column 21. In the inner column 22, the column large-diameter portion 25 and the connection portion 26 form a non-insertable region which cannot enter into the outer column 21.

A front-end portion of the column large-diameter portion 25 constitutes a thickened portion 25*a* of which an inner diameter is larger than that of a portion positioned behind the front-end portion (hereinafter referred to as a thinned portion 25*b*). A stepped surface (a first stopper) 25*c* orthogonal to the axis O is formed at a boundary between the thickened portion 25*a* and the thinned portion 25*b*. Also, if the column large-diameter portion 25 is configured to have at least the stepped surface 25*c*, dimensions of the outer diameter and the inner diameter can be changed as appropriate.

<Steering Shaft>

As shown in FIG. 1, the steering shaft 12 includes an outer shaft (a front shaft) 40 and an inner shaft (a rear shaft) 41.

The outer shaft 40 is formed in a hollow cylindrical shape extending along the axis O. The outer shaft 40 is inserted into the outer column 21. A gap is formed between an outer circumferential surface of the outer shaft 40 and the inner circumferential surface of the outer column 21 in the radial direction. A rear-end portion of the outer shaft 40 enters into the inner column 22. A front-end portion of the outer shaft 40 is press-fitted to an inner ring of the front bearing 28 described above. Thus, the outer shaft 40 is supported in the outer column 21 via the front bearing 28 to be rotatable around the axis O. The front-end portion of the outer shaft 40 protrudes forward from the outer column 21. The front-end portion of the outer shaft 40 (a portion protruding forward from the outer column 21) is connected to, for example, a steering gear box (not shown) or the like via a universal joint (not shown) or the like.

A key lock collar 45 is externally fitted to an axially intermediate portion of the outer shaft 40 (fitted to the outer circumferential surface of the outer shaft 40). The key lock collar 45 is formed in a tubular shape. An outer diameter of the key lock collar 45 is smaller than an inner diameter of the column small-diameter portion 24. Grooves 46 extending in the axial direction are formed in the key lock collar 45. A plurality of grooves 46 are formed at intervals in the circumferential direction. In the outer column 21, a slit 48 penetrating the outer column 21 is formed in a portion positioned below the key lock collar 45. At the time of ignition off or the like in the vehicle, a locking member (not shown) enters into any one of the grooves 46 through the slit 48 (a locked state). Thus, rotation of the steering shaft 12 relative to the column unit 11 is restricted.

The inner shaft 41 is formed in a hollow cylindrical shape extending along the axis O. Specifically, in the inner shaft 41, a sliding portion (an insertable region) 51, a bearing-mounting portion (a non-insertable region) 52, and a wheel connection portion (a non-insertable region) 53 are formed consecutively from the front to the rear. In the present embodiment, the sliding portion 51, the bearing-mounting portion 52, and the wheel connection portion 53 are formed to have a uniform diameter.

The sliding portion 51 is inserted into the outer shaft 40 from behind. The inner shaft 41 is configured to be movable relative to the outer shaft 40 in the axial direction while an outer circumferential surface of the sliding portion 51 slides on an inner circumferential surface of the outer shaft 40 with the movement of the inner column 22 relative to the outer column 21 in the axial direction. In addition, for example, a male spline (not shown) is formed on the outer circumferential surface of the sliding portion 51. The male spline engages with a female spline (not shown) formed on the inner circumferential surface of the outer shaft 40. Thus, the inner shaft 41 moves relative to the outer shaft 40 in the axial direction while its rotation relative to the outer shaft 40 is restricted. However, a structure for a telescopic operation and a structure for a rotation restriction of the steering shaft 12 can be changed as appropriate.

The wheel connection portion 53 protrudes rearward from the inner column 22. The steering wheel 2 is connected to the wheel connection portion 53.

As shown in FIG. 2, rear bearings 61 and 62 are mounted at both end portions of the bearing-mounting portion 52 in the axial direction. Thus, the inner shaft 41 is configured to be rotatable relative to the inner column 22 around the axis O.

The rear bearings 61 and 62 are a first bearing 61 and a second bearing 62 positioned behind the first bearing 61. Inner rings of the respective rear bearings 61 and 62 are press-fitted into the bearing-mounting portion 52 with a spacer 65 interposed between the respective rear bearings 61 and 62. The spacer 65 is formed in a tubular shape surrounding a circumference of the inner shaft 41. Both end faces of the spacer 65 in the axial direction come into contact with the inner rings of the respective rear bearings 61 and 62. Also, the spacer 65 may be formed integrally with the inner shaft 41.

The outer rings of the rear bearings 61 and 62 are press-fitted into the thinned portion 25b of the column large-diameter portion 25. The outer ring of the first bearing 61 comes into contact with the above-described stepped surface 25c from behind. On the other hand, a caulking portion (a second stopper) 67 formed at a rear-end portion of the column large-diameter portion 25 abuts the outer ring of the second bearing 62 from behind.

In the present embodiment, a distance D between the rear bearings 61 and 62 (an interval between the rear bearings 61 and 62) is preferably set to be 40 mm or less, and is more preferably set to be 20 mm or more and 40 mm or less.

Also, the steering device 1 of the present embodiment includes a telescopic adjustment mechanism (not shown). The telescopic adjustment mechanism switches between a locked state that restricts the movement of the inner column 22 (inner shaft 41) relative to the outer column 21 (outer shaft 40) in the axial direction and an unlocked state that allows the movement in the axial direction. For example, in the locked state, the telescopic adjustment mechanism fastens the inner column 22 via the outer column 21. Thus, the movement of the inner column 22 relative to the outer column 21 is restricted.

On the other hand, in the unlocked state, the telescopic adjustment mechanism releases the fastening of the inner column 22. Thus, the movement of the inner column 22 relative to the outer column 21 is allowed. For example, in the unlocked state, by pushing the steering wheel 2 forward, the steering wheel 2 moves forward together with the inner column 22 and the inner shaft 41. In the unlocked state, by pulling the steering wheel 2 rearward, the steering wheel 2 moves rearward together with the inner column 22 and the inner shaft 41. Then, by switching the telescopic adjustment mechanism to the locked state again, a position of the steering wheel 2 in the front-to-rear direction can be set to an arbitrary position.

In the case of a secondary collision, a collision load directed forward is applied to the steering wheel 2 from the driver. When the collision load is equal to or more than a predetermined value, the steering wheel 2 moves forward relative to the outer column 21 (outer shaft 40) together with the inner column 22 and the inner shaft 41. At this time, the collision load applied to the driver at the time of the secondary collision is relieved by a sliding resistance between the outer column 21 and the inner column 22.

On the other hand, in the configuration of Patent Literature 1 mentioned above, the inner shaft is rotatably supported in the outer column disposed further forward in the vehicle body, and the outer shaft is rotatably supported in the inner column disposed further rearward in the vehicle body. In this case, if a mounting member such as a key lock collar is mounted forward in the vehicle body, the mounting member and the outer shaft may interfere with each other when the inner column (outer shaft) moves forward. For this reason, in the configuration of Patent Literature 1, it is difficult to secure a stroke amount in the telescopic operation and a secondary collapse.

Therefore, the present embodiment is configured such that the outer shaft 40 is rotatably supported in the outer column 21 disposed on the front side of the vehicle body, and the inner shaft 41 is rotatably supported in the inner column 22 disposed on the rear side of the vehicle body.

According to this configuration, the mounting member (for example, the key lock collar 45 or the like) can be inhibited from being disposed on a movement trajectory of the inner column 22 or the inner shaft 41. For this reason, interference between the inner column 22 or the inner shaft 41 and the mounting member at the time of the stroke such as during the telescopic operation or the secondary collapse can be inhibited. Thus, the stroke amount of the inner column 22 and the inner shaft 41 can be secured as compared to the conventional technique.

In particular, in the present embodiment, the rear bearings 61 and 62 are mounted on the bearing-mounting portion 52 with an interval therebetween in the axial direction.

According to this configuration, in a rear portion of the inner shaft 41, the plurality of rear bearings 61 and 62 can be mounted on a portion which is configured not to be capable of being inserted into the outer shaft 40 at the time of the telescopic operation or the secondary collapse. Thus, interference between the first bearing 61 and the outer shaft 40 and members surrounding the outer shaft 40 can be inhibited at the time of the stroke. A displacement of the inner shaft 41 is inhibited by the rear bearings 61 and 62, and the inner shaft 41 is stably supported. Thus, vibrational stiffness can be improved.

Therefore, in the present embodiment, a desired vibrational stiffness can be obtained while securing the stroke amount.

In the present embodiment, the outer diameter of the key lock collar 45 is configured to be smaller than an inner diameter of the inner column 22.

According to this configuration, regardless of the place where the key lock collar 45 is disposed, interference between the inner column 22 and the key lock collar 45 can be reliably inhibited at the time of the stroke of the inner column 22. Thus, the stroke amount of the inner column 22 can be secured.

Second Embodiment

Figure 3:
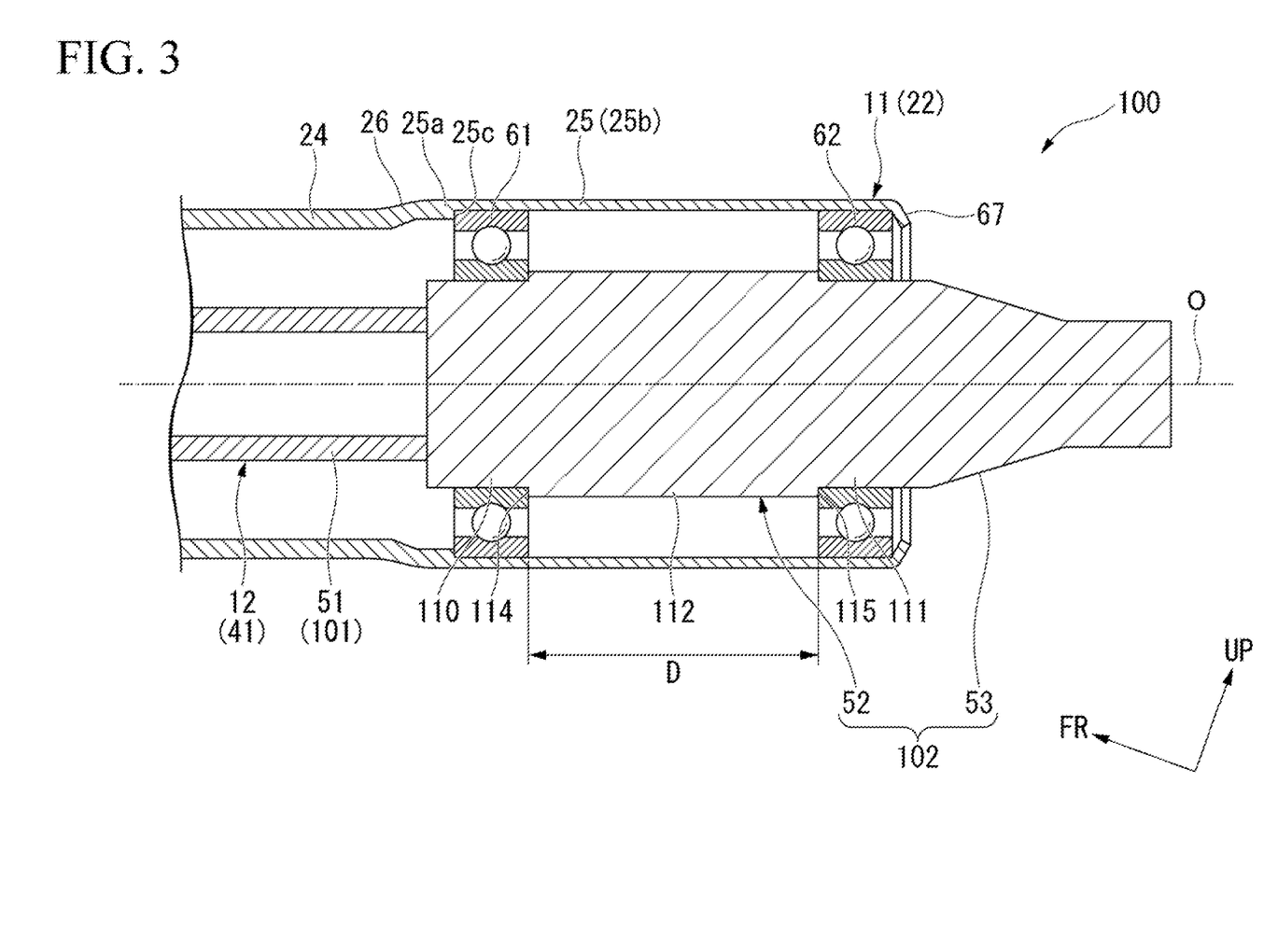
FIG. 3 is an enlarged cross-sectional view showing a steering device according to a second embodiment.

Next, a second embodiment of the present disclosure will be described. FIG. 3 is an enlarged cross-sectional view of a steering device 100 according to the second embodiment. The present embodiment is different from the above-described embodiment in that the bearing-mounting portion 52 is formed to have a diameter larger than that of the sliding portion 51. In the following description, components the same as those of the above-described embodiment are denoted by the same reference signs, and the description thereof will be omitted.

In the steering device 100 shown in FIG. 3, the inner shaft 41 has a tubular portion 101 and a solid portion 102. The tubular portion 101 constitutes the sliding portion 51. The solid portion 102 is joined to a rear-end portion of the tubular portion 101. The solid portion 102 constitutes the bearing-mounting portion 52 and the wheel connection portion 53. That is, in the present embodiment, the sliding portion 51 is formed in a hollow cylindrical shape as in the first embodiment described above. On the other hand, the bearing-mounting portion 52 and the wheel connection portion 53 are formed integrally in a solid cylindrical shape.

The bearing-mounting portion 52 has small-diameter portions (a first small-diameter portion 110 and a second small-diameter portion 111) positioned at both end portions in the axial direction, and a large-diameter portion 112 positioned between the small-diameter portions 110 and 111.

Outer diameters of the small-diameter portions 110 and 111 are larger than an outer diameter of the sliding portion 51.

A first boundary surface 114 orthogonal to the axis O is formed at a boundary between the first small-diameter portion 110 and the large-diameter portion 112.

On the other hand, a second boundary surface 115 orthogonal to the axis O is formed at a boundary between the second small-diameter portion 111 and the large-diameter portion 112.

The inner ring of the first bearing 61 is externally fitted to the first small-diameter portion 110 (fitted to an outer circumferential surface of the first small-diameter portion 110). The inner ring of the first bearing 61 comes into contact with the first boundary surface 114 from the front. On the other hand, the outer ring of the first bearing 61 comes into contact with the above-described stepped surface 25c from behind.

The inner ring of the second bearing 62 is externally fitted to the second small-diameter portion 111 (fitted to an outer circumferential surface of the second small-diameter portion 111). The inner ring of the second bearing 62 comes into contact with the second boundary surface 115 from behind. On the other hand, the outer ring of the second bearing 62 abuts the caulking portion 67 from the front.

Also in the present embodiment, the distance D between the rear bearings 61 and 62 (a length of the large-diameter portion 112 in the axial direction) is preferably set to be 40 mm or less, and is more preferably set to be 20 mm or more and 40 mm or less.

Also, a method for assembling the inner shaft 41 to the inner column 22 is as follows.

First, the first bearing 61 is press-fitted into the first small-diameter portion 110. Next, the inner shaft 41 is press-fitted into the inner column 22 from behind. The inner shaft 41 is press-fitted until the outer ring of the first bearing 61 abuts the stepped surface 25c. Thus, the first bearing 61 is press-fitted into the inner column 22.

Subsequently, the second bearing 62 is press-fitted between the second small-diameter portion 111 and the thinned portion 25b of the inner column 22 from behind. Then, the rear-end portion of the inner column 22 is caulked to form the caulking portion 67. Thus, the inner shaft 41 is rotatably assembled to the inner column 22.

With this configuration, a positional deviation of the rear bearings 61 and 62 relative to the inner column 22 in the axial direction can be inhibited and the inner shaft 41 can be prevented from coming off.

In particular, since the steering shaft 12 is prevented from coming off by the stepped surface 25c and the caulking portion 67 which are formed in the inner column 22, it is unnecessary to separately use a stop ring or the like for fixing the outer ring. For this reason, the number of components can be reduced.

A diameter of the wheel connection portion 53 is gradually reduced rearward from a rear end edge of the second small-diameter portion 111, and then the wheel connection portion 53 further extends rearward. The steering wheel 2 is connected to a rear-end portion of the wheel connection portion 53.

In the present embodiment, the bearing-mounting portion 52 is configured to be formed by the solid portion 102.

According to this configuration, rigidity of the bearing-mounting portion 52 can be improved, so that vibrational stiffness can be further improved.

In particular, in the present embodiment, only the bearing-mounting portion 52 and the wheel connection portion 53 are formed by the solid portion 102. Thus, in the present embodiment, it is possible to inhibit an increase in weight accompanying the adoption of the solid portion 102 as much as possible, as compared to a case in which the entire inner shaft 41 is formed to be solid.

In the present embodiment, an outer diameter of the bearing-mounting portion 52 is configured to be larger than the outer diameter of the sliding portion 51.

According to this configuration, since rigidity of the inner shaft 41 can be improved, vibrational stiffness can be improved.

Moreover, in the present embodiment, only the bearing-mounting portion 52 is formed to have a larger diameter. Thus, in the present embodiment, it is possible to inhibit an increase in weight accompanying the increase in diameter as much as possible, as compared to a case in which the entire inner shaft 41 is formed to have a large-diameter.

In addition, although the case where the bearing-mounting portion 52 and the wheel connection portion 53 are formed to be solid have been described in the second embodiment described above, the present disclosure is not limited only to this configuration. At least one of the bearing-mounting portion 52 and the wheel connection portion 53 may be hollow.

In the second embodiment described above, although the configuration in which the inner shaft 41 is formed to be solid and is enlarged in diameter in order to secure rigidity of the inner shaft 41 has been described, the present disclosure is not limited to this configuration, and a part of the inner shaft 41 may be formed to have a thicker thickness.

Figure 4:
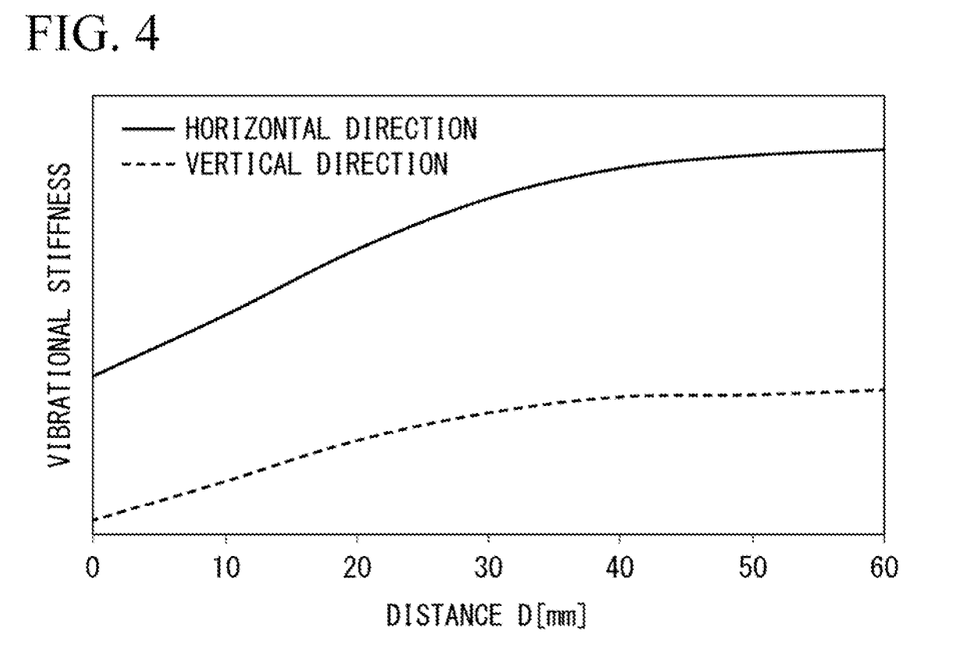
FIG. 4 is a graph showing a relationship between a distance D between a first bearing and a second bearing and vibrational stiffness.

Here, the present inventor studied a relationship between the distance D between the rear bearings 61 and 62 and vibrational stiffness by using a simulation. FIG. 4 is a graph showing the relationship between the distance D and vibrational stiffness. Also, in FIG. 4, a solid line indicates vibrational stiffness in the horizontal direction, and a broken line indicates vibrational stiffness in the vertical direction.

As shown in FIG. 4, it can be understood that vibrational stiffness increases as the distance D increases. However, a rate of change in vibrational stiffness in the range where the distance D is longer than 40 mm is smaller than a rate of change in vibrational stiffness in the range where the distance D is 40 mm or less. That is, it can be understood that, if the distance D exceeds a predetermined range, even when the distance D increases therefrom, no significant improvement in the vibrational stiffness can be expected.

Therefore, as in the present embodiment, even when the portion of the inner shaft 41 positioned behind the sliding portion 51 is set to be the bearing-mounting portion 52, it is unnecessary to secure a pretty large length of the bearing-mounting portion 52 in the axial direction in order to secure vibrational stiffness.

Since a required vibrational stiffness varies depending on a vehicle where it is mounted, the distance D may be set appropriately. In the present embodiment, the distance D between the rear bearings 61 and 62 is set to be 20 mm or more and 40 mm or less. Thus, interference between the first bearing 61 and a mounting member can be inhibited, and a desired vibrational stiffness can be obtained while securing the stroke amount. The distance D is more preferably set to be 25 mm or more and 35 mm or less. As a result, a balance between a weight of the bearing-mounting portion 52 and vibrational stiffness is improved, and vibrational stiffness can be enhanced without excessively increasing the weight. The steering shaft 12 is not limited to the configuration including the outer shaft 40 and the inner shaft 41. Even in a configuration consisting of a single steering shaft, a desired vibrational stiffness can be obtained by setting the distance D between the rear bearings 61 and 62 in the same manner. That is, even in a configuration in which the steering shaft is rotatably supported in a steering column via the rear bearings 61 and 62 and the front bearing 28, the rear bearings 61 and 62 may be spaced apart at a distance D.

Third Embodiment

Figure 5:
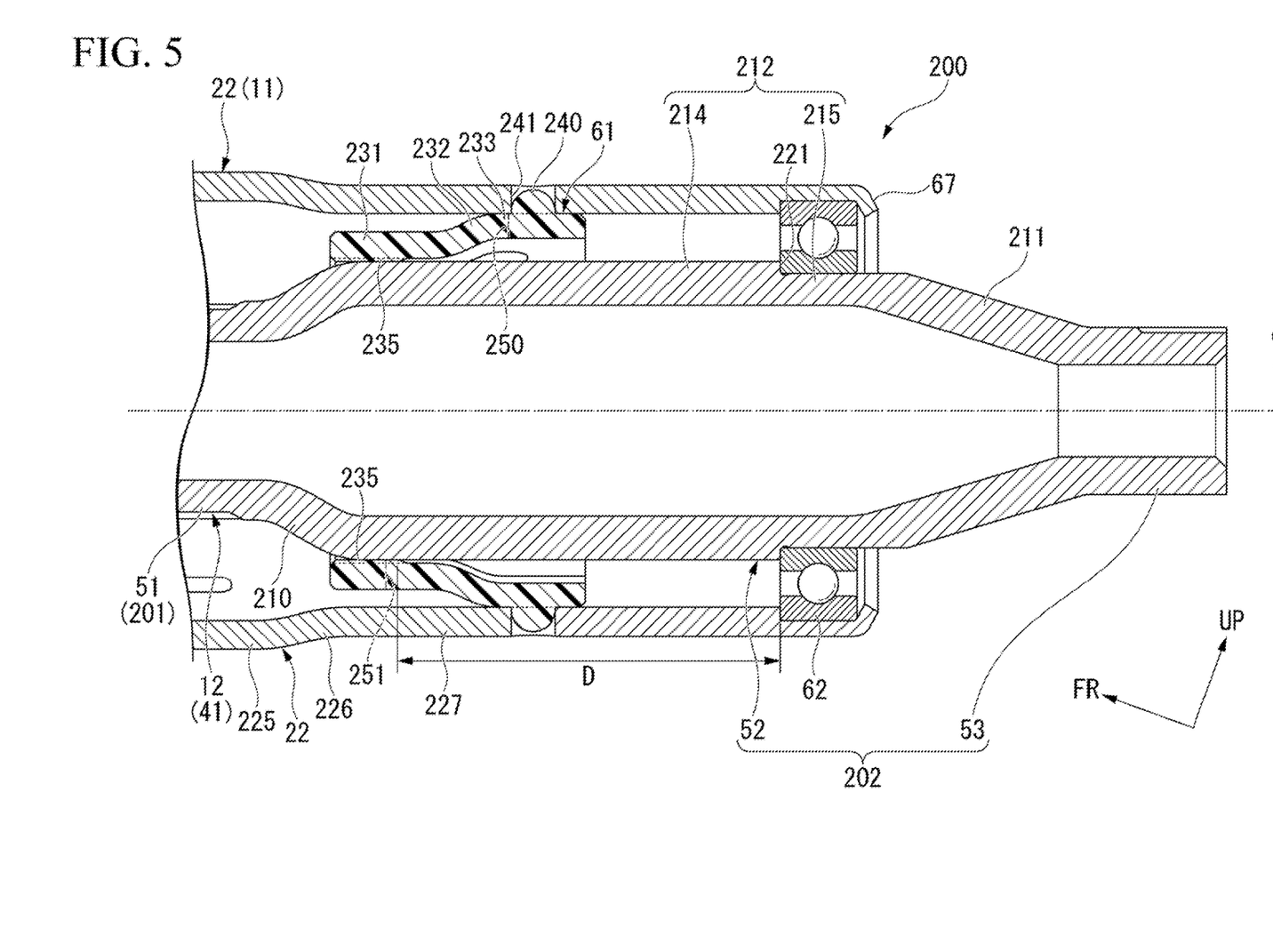
FIG. 5 is an enlarged cross-sectional view showing a steering device according to a third embodiment.

Next, a third embodiment of the present disclosure will be described. FIG. 5 is an enlarged cross-sectional view of a steering device 200 according to the third embodiment. The present embodiment is different from the embodiments described above in that a resin bush is used for at least one of the rear bearings 61 and 62 (the first bearing 61 in the present embodiment).

In the steering device 200 shown in FIG. 5, the inner shaft 41 is formed in a hollow cylindrical shape throughout the entire shaft in the axial direction. The inner shaft 41 has a tubular portion 201 and a support portion 202. The tubular portion 201 constitutes a sliding portion 51.

The support portion 202 extends rearward from a rear-end portion of the tubular portion 201. The support portion 202 constitutes the bearing-mounting portion 52 and the wheel connection portion 53.

The bearing-mounting portion 52 has tapered portions (a first tapered portion 210 and a second tapered portion 211) positioned at both end portions in the axial direction, and a large-diameter portion 212 positioned between the tapered portions 210 and 211.

The first tapered portion 210 is gradually enlarged in diameter toward the rear. A front-end portion of the first tapered portion 210 is connected to a rear-end portion of the tubular portion 201. A rear-end portion of the first tapered portion 210 is connected to a front-end portion of the large-diameter portion 212.

The second tapered portion 211 is gradually enlarged in diameter toward the front. A front-end portion of the second tapered portion 211 is connected to a rear-end portion of the large-diameter portion 212.

A reduced diameter portion 215 whose outer diameter is reduced as compared to its front portion (an enlarged diameter portion 214) is formed at the rear-end portion of the large-diameter portion 212. A rear end face (a stepped surface between the enlarged diameter portion 214 and the reduced diameter portion 215) of the enlarged diameter portion 214 constitutes a second boundary surface 221 orthogonal to the axis O.

The inner column 22 has a column large-diameter portion 225, a connection portion 226 and a column small-diameter portion 227. The column large-diameter portion 225 is positioned in front of the column small-diameter portion 227. The connection portion 226 connects between a rear-end portion of the column large-diameter portion 225 and a front-end portion of the column small-diameter portion 227.

An outer diameter of the column large-diameter portion 225 is smaller than the inner diameter of the outer column 21. The column large-diameter portion 225 is inserted into the outer column 21 from behind the outer column 21.

As shown in FIG. 5, the first bearing 61 in the present embodiment is a resin bush. The first bearing 61 is formed in a multi-stepped cylindrical shape disposed coaxially with the axis O. Specifically, the first bearing 61 has a shaft support portion 231, a connection cylinder 232, and a column support portion 233.

The shaft support portion 231 is formed to be smaller in diameter than the column support portion 233. The shaft support portion 231 surrounds a front-end portion of the large-diameter portion 212 (the enlarged diameter portion 214). Sliding support portions 235 are formed on an inner circumferential surface of the shaft support portion 231. The sliding support portions 235 bulge out from the inner circumferential surface of the shaft support portion 231 inward in the radial direction. A plurality of sliding support portions 235 are disposed at intervals in the circumferential direction. Each sliding support portion 235 slidably supports an outer circumferential surface of the large-diameter portion 212. Therefore, the shaft support portion 231 rotatably supports the inner shaft 41 via the sliding support portions 235. Also, the shaft support portion 231 may directly support the inner shaft 41.

The connecting cylinder 232 is gradually enlarged in diameter toward the rear. The connection cylinder 232 may connect the shaft support portion 231 and the column support portion 233 via a step.

An inner diameter of the column support portion 233 is larger than an outer diameter of the inner shaft 41. An outer diameter of the column support portion 233 is equal to or less than the inner diameter of the inner column 22 (column small-diameter portion 227). Therefore, an outer circumferential surface of the column support portion 233 approaches or abuts an inner circumferential surface of the inner column 22 (column small-diameter portion 227). Positioning convex portions 240 are formed on the column support portion 233. The positioning convex portions 240 are formed in hemispherical shapes which bulge out from the column support portion 233 outward in the radial direction. The positioning convex portions 240 are fitted into positioning holes 241 formed in the inner column 22. Thus, rotation of the first bearing 61 relative to the inner column 22 around the axis O is restricted. In the present embodiment, a plurality of positioning convex portions 240 are disposed at intervals in the circumferential direction.

A front slit 250 and a rear slit 251 are formed in the first bearing 61. Each slit 250 and 251 extends in the axial direction. The slits 250 and 251 are alternately (by turns) disposed in the circumferential direction.

The front slit 250 opens at a front end face of the shaft support portion 231 and reaches a front portion of the column support portion 233 through the connection cylinder 232.

The rear slit 251 opens at a rear end face of the column support portion 233 and reaches a rear portion of the shaft support portion 231 through the connection cylinder 232.

In the first bearing 61, portions positioned between the front slits 250 adjacent to each other in the circumferential direction (mainly the shaft support portion 231 and the connection cylinder 232) are configured to be elastically deformable in the radial direction.

In the first bearing 61, portions positioned between the rear slits 251 adjacent to each other in the circumferential direction (mainly the column support portion 233 and the connection cylinder 232) are configured to be elastically deformable in the radial direction.

The inner ring of the second bearing 62 is press-fitted into the reduced diameter portion 215 of the inner shaft 41. The inner ring of the second bearing 62 abuts the second boundary surface 221 from behind.

The outer ring of the second bearing 62 is press-fitted into the inner column 22. The caulking portion 67 abuts the outer ring of the second bearing 62 from behind.

Also in the present embodiment, the distance D between the rear bearings 61 and 62 (the distance between the rear bearings 230 and 62) may be set to be 40 mm or less.

In the present embodiment, in addition to achieving effects similar to those of the above-described embodiments, a configurational simplification can be achieved by adopting the resin bush for the first bearing 61.

In the embodiment described above, although the case where the resin bush is adopted for the first bearing 61 has been described, the present disclosure is not limited to this configuration. The resin bush may be configured to be adopted to at least one of the front bearing 28 and the rear bearings (the first bearing 61 and the second bearing 62). In the case of using the resin bush for the second bearing 62, for example, the second bearing 62 may be assembled to the inner shaft 41 with the shaft support portion 231 facing rearward.

As described above, although the preferred embodiments of the present disclosure have been described, the present disclosure is not limited to these embodiments. Additions, omissions, substitutions, and other modifications of the configuration are possible without departing from the spirit of the present disclosure. The present disclosure is not limited by the foregoing description, but is only limited by the scope of the appended claims.

For example, in the embodiments described above, although the configuration in which the axis O intersects in the front-to-rear direction has been described, the present disclosure is not limited to this configuration. The axis O may coincide with a longitudinal direction of the vehicle 3 or may be inclined in a lateral direction thereof.

In the embodiments described above, although the configuration in which the outer column 21 supports the outer shaft 40 and the inner column 22 supports the inner shaft 41 behind the outer column 21 has been described, the present disclosure is not limited to this configuration. For example, the outer column 21 may support the inner shaft 41, and the inner column 22 may support the outer shaft 40 behind the outer column 21.

The outer column (rear column) 21 may be configured to be positioned behind the inner column (front column) 22. In this case, the outer column 21 may support any one of the outer shaft 40 and the inner shaft 41 (rear shaft). The inner column 22 may support the other one of the outer shaft 40 and the inner shaft 41 (front shaft).

In the embodiments described above, the configuration in which the rear bearings 61 and 62 are disposed at the rear portion of the inner column 22 positioned on the rear side of the vehicle body has been described. However, when the outer column 21 is disposed on the rear side of the vehicle body, a configuration in which two front bearings are provided may be adopted. Also in this case, the distance between the front bearings is preferably set to be 40 mm or less, more preferably 20 mm or more and 40 mm or less, and further preferably 25 mm or more to 35 mm or less. Thus, a desired vibrational stiffness can be obtained while securing the stroke amount.

In the embodiments described above, although the configuration in which the key lock collar 45 is externally fitted to the outer shaft 40 has been described, the present disclosure is not limited to this configuration. For example, the steering device 1 may not have the key lock collar 45. A mounting member other than the key lock collar 45 may be externally fitted to the outer shaft 40.

In addition, it is possible to replace components in the above-described embodiments with known components as appropriate without departing from the spirit of the present disclosure, and the above-described modified examples may be combined as appropriate.

REFERENCE SIGNS LIST

1 Steering device
2 Steering wheel
21 Outer column (front column or rear column)
22 Inner column (rear column or front column)
25*c* Stepped surface (first stopper)
28 Front bearing
40 Outer shaft (front shaft or rear shaft)
41 Inner shaft (rear shaft or front shaft)
45 Key lock collar
51 Sliding portion (insertable region)
52 Bearing-mounting portion (non-insertable region)
53 Wheel connection portion (non-insertable region)
61 First bearing (rear bearing)
62 Second bearing (rear bearing)
67 Caulking portion (second stopper)

The invention claimed is:

1. A steering device, comprising:
an outer shaft;
an inner shaft which is inserted into the outer shaft to be movable relative to the outer shaft in a shaft axis direction thereof and to which a steering wheel is attached;
an outer column configured to rotatably support the outer shaft around the shaft axis via a front bearing; and
an inner column configured to rotatably support the inner shaft around the shaft axis via a rear bearing, the inner column being inserted into the outer column to be movable relative to the outer column in the shaft axis direction,
wherein the inner shaft includes an insertable region which is to be inserted into the outer shaft, and a non-insertable region which is connected to the insertable region in the shaft axis direction and is not to be inserted into the outer shaft, and
the rear bearing includes a first bearing and a second bearing which are disposed with an interval therebetween in the shaft axis direction in the non-insertable region, the first bearing being separate and distinct from the second bearing.

2. The steering device according to claim 1, wherein at least one of the front bearing, the first bearing, and the second bearing is a resin bush.

3. The steering device according to claim 2, wherein the non-insertable region is formed to be larger in diameter than the insertable region.

4. The steering device according to claim 2,
wherein the insertable region is formed in a hollow cylindrical shape, and
the non-insertable region is formed in a solid cylindrical shape and the non-insertable region is joined to a rear-end portion of the insertable region and constitutes a bearing-mounting portion and a wheel connection portion.

5. The steering device according to claim 2,
wherein a key lock collar configured to restrict rotation of the outer shaft relative to the outer column in a locked state is externally fitted to the outer shaft, and
an outer diameter of the key lock collar is smaller than an inner diameter of the inner column.

6. The steering device according to claim 1,
wherein the first bearing is positioned forward from the second bearing in the vehicle body,
a first stopper which comes into contact with an outer ring of the first bearing in the shaft axis direction is formed in a portion of the inner column positioned forward from the first bearing in the vehicle body, and
a second stopper which comes into contact with an outer ring of the second bearing in the shaft axis direction is formed in a portion of the inner column positioned rearward from the second bearing in the vehicle body.

7. The steering device according to claim 6, wherein the non-insertable region is formed to be larger in diameter than the insertable region.

8. The steering device according to claim 6,
wherein the insertable region is formed in a hollow cylindrical shape, and
the non-insertable region is formed in a solid cylindrical shape and the non-insertable region is joined to a rear-end portion of the insertable region and constitutes a bearing-mounting portion and a wheel connection portion.

9. The steering device according to claim 6,
wherein a key lock collar configured to restrict rotation of the outer shaft relative to the outer column in a locked state is externally fitted to the outer shaft, and
an outer diameter of the key lock collar is smaller than an inner diameter of the inner column.

10. The steering device according to claim 1, wherein the non-insertable region is formed to be larger in diameter than the insertable region.

11. The steering device according to claim 10,
wherein the insertable region is formed in a hollow cylindrical shape, and
the non-insertable region is formed in a solid cylindrical shape and the non-insertable region is joined to a rear-end portion of the insertable region and constitutes a bearing-mounting portion and a wheel connection portion.

12. The steering device according to claim 10,
wherein a key lock collar configured to restrict rotation of the outer shaft relative to the outer column in a locked state is externally fitted to the outer shaft, and
an outer diameter of the key lock collar is smaller than an inner diameter of the inner column.

13. The steering device according to claim 1,
wherein the insertable region is formed in a hollow cylindrical shape, and
the non-insertable region is formed in a solid cylindrical shape and the non-insertable region is joined to a rear-end portion of the insertable region and constitutes a bearing-mounting portion and a wheel connection portion.

14. The steering device according to claim 13,
wherein a key lock collar configured to restrict rotation of the outer shaft relative to the outer column in a locked state is externally fitted to the outer shaft, and
an outer diameter of the key lock collar is smaller than an inner diameter of the inner column.

15. The steering device according to claim 1,
wherein a key lock collar configured to restrict rotation of the outer shaft relative to the outer column in a locked state is externally fitted to the outer shaft, and
an outer diameter of the key lock collar is smaller than an inner diameter of the inner column.

* * * * *